US012633460B2

(12) United States Patent
Hashimoto et al.

(10) Patent No.: US 12,633,460 B2
(45) Date of Patent: May 19, 2026

(54) MULTILAYER CERAMIC CAPACITOR INCLUDING DIELECTRIC CERAMIC LAYERS INCLUDING CRYSTAL GRAINS

(71) Applicant: Murata Manufacturing Co., Ltd., Nagaokakyo (JP)

(72) Inventors: Hideyuki Hashimoto, Nagaokakyo (JP); Takehisa Sasabayashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 115 days.

(21) Appl. No.: 18/608,993

(22) Filed: Mar. 19, 2024

(65) Prior Publication Data

US 2024/0274357 A1 Aug. 15, 2024

Related U.S. Application Data

(63) Continuation of application No. PCT/JP2022/035443, filed on Sep. 22, 2022.

(30) Foreign Application Priority Data

Sep. 28, 2021 (JP) ................................. 2021-158285

(51) Int. Cl.
*H01G 4/12* (2006.01)
*H01G 4/008* (2006.01)
(Continued)

(52) U.S. Cl.
CPC .......... *H01G 4/1272* (2013.01); *H01G 4/008* (2013.01); *H01G 4/012* (2013.01); *H01G 4/12* (2013.01);
(Continued)

(58) Field of Classification Search
CPC ...... H01G 4/1272; H01G 4/008; H01G 4/012; H01G 4/30; H01G 4/0085; H01G 4/1227; H01G 4/232; C04B 35/468; Y02E 60/13
See application file for complete search history.

(56) References Cited

U.S. PATENT DOCUMENTS

| | | | |
|---|---|---|---|
| 2008/0044673 A1* | 2/2008 | Miyamoto ............... | H01G 4/33 |
| | | | 427/372.2 |
| 2013/0063862 A1* | 3/2013 | Kim ......................... | H01G 4/30 |
| | | | 156/182 |

(Continued)

FOREIGN PATENT DOCUMENTS

| | | |
|---|---|---|
| JP | 5211262 B1 | 6/2013 |
| JP | 2014084267 A | 5/2014 |

(Continued)

OTHER PUBLICATIONS

International Search Report in PCT/JP2022/035443, mailed Nov. 1, 2022, 3 pages.

(Continued)

*Primary Examiner* — Timothy J. Dole
*Assistant Examiner* — Daniel M Dubuisson
(74) *Attorney, Agent, or Firm* — Keating & Bennett, LLP

(57) ABSTRACT

A multilayer ceramic capacitor includes outer electrodes at first and second end surfaces and coupled to inner electrode layers. Dielectric ceramic layers include crystal grains including a perovskite oxide. When a cross-section of the dielectric ceramic layers is observed using a scanning transmission electron microscope, the dielectric ceramic layers include grains, on which a plane of a perovskite structure is observed, as crystal grains. When a thickness of the dielectric ceramic layers is denoted by d, at least a subset of the grains is provided in near-electrode regions located inside the dielectric ceramic layers and extending to a distance of (Continued)

100 about 0.1 d from interfaces with adjacent inner electrode layers.

19 Claims, 9 Drawing Sheets

(51) Int. Cl.
   *H01G 4/012* (2006.01)
   *H01G 4/30* (2006.01)
(52) U.S. Cl.
   CPC ............. *H01G 4/1227* (2013.01); *H01G 4/30* (2013.01); *H01G 4/1209* (2013.01)

(56)                     References Cited

U.S. PATENT DOCUMENTS

2015/0055273 A1     2/2015   Endo et al.
2015/0279565 A1    10/2015   Teraoka et al.
2016/0005950 A1*    1/2016   Itayama ............. H10N 30/8554
                                                            347/68
2016/0358712 A1    12/2016   Doi et al.
2019/0139704 A1*    5/2019   Arai ......................... H01G 4/12
2020/0266264 A1     8/2020   Kim et al.
2021/0151552 A1*    5/2021   Lee ......................... H10D 1/692

FOREIGN PATENT DOCUMENTS

JP         2015053530  A      3/2015
JP         2015062216  A      4/2015
KR       20160143516  A     12/2016

OTHER PUBLICATIONS

Written Opinion in PCT/JP2022/035443, mailed Nov. 1, 2022, 4 pages.

* cited by examiner

100

Ba   Ti   Ba

Ba Ti Ba

Ba LATTICE SPACING, 440 pm (c = 4.04 Å)

MULTILAYER CERAMIC CAPACITOR INCLUDING DIELECTRIC CERAMIC LAYERS INCLUDING CRYSTAL GRAINS

CROSS REFERENCE TO RELATED APPLICATIONS

This application claims the benefit of priority to Japanese Patent Application No. 2021-158285 filed on Sep. 28, 2021 and is a Continuation Application of PCT Application No. PCT/JP2022/035443 filed on Sep. 22, 2022. The entire contents of each application are hereby incorporated herein by reference.

BACKGROUND OF THE INVENTION

1. Field of the Invention

The present invention relates to multilayer ceramic capacitors.

2. Description of the Related Art

As mobile phones and other electronic devices become smaller, and CPUs become faster, the demand for multilayer ceramic capacitors (MLCCs) is becoming increasingly higher. A multilayer ceramic capacitor has a structure in which dielectric ceramic layers and inner electrode layers are stacked alternately and has a large electrostatic capacitance despite its compact size due to the high-dielectric-constant dielectric ceramic layers formed as thin layers. Although multilayer ceramic capacitors with various materials are known, ones made using a barium titanate ($BaTiO_3$) compound in the dielectric ceramic layers and a non-precious metal, such as nickel (Ni), in the inner electrode layers are commonly used because they are inexpensive and exhibit high characteristics.

To achieve a compact size and a large capacitance of a multilayer ceramic capacitor, it is important to form the dielectric ceramic layers as thin layers and increase their dielectric constant at the same time. More specifically, when the area over which the inner electrode layers surface each other is denoted by S, the number of dielectric ceramic layers sandwiched between the inner electrode layers is denoted by n, the relative permittivity of the dielectric ceramic layers is denoted by $\varepsilon_r$, the thickness of the dielectric ceramic layers is denoted by t, and the relative permittivity of a vacuum is denoted by co, the electrostatic capacitance C of the multilayer ceramic capacitor is proportional to the relative permittivity $\varepsilon_r$ as indicated in formula (1) below.

$$C = \varepsilon_0 \varepsilon_r \frac{nS}{t} \ ... \tag{1}$$

In this regard, it has been proposed to increase the dielectric constant by controlling parameters such as the composition and its distribution or the grain diameter of the crystal grains in the dielectric ceramic layers. For example, in Japanese Unexamined Patent Application Publication No. 2014-084267, it is disclosed with regard to a dielectric ceramic including crystal grains including barium titanate as their base component and to a multilayer ceramic capacitor made by applying this dielectric ceramic to its dielectric layers that the rare earth element concentration is maximized at the surface of the crystal grains and set to 0.1 atomic % or less in the region deeper than 100 nm from the surface (See, for example, claim 1 [0001] and of Japanese Unexamined Patent Application Publication No. 2014-084267). Japanese Unexamined Patent Application Publication No. 2014-084267 also states that the crystal grains include a large percentage of a high-ferroelectricity crystal phase in the inner region (core portion) because they include a small amount of rare earth element in this region, and this allows for strengthening the dielectric constant (See, for example, [0016] and [0018] of Japanese Unexamined Patent Application Publication No. 2014-084267).

In Japanese Unexamined Patent Application Publication No. 2015-053530, a multilayer ceramic capacitor is disclosed whose ceramic dielectric layers are formed by sintered grains including core-shell grains and uniform solid-solution grains, in which the percentage by area of the core-shell grains to the entire set of sintered grains is from 5% to 15%, and in which the average grain diameter of the entire set of sintered grains is from 0.3 to 0.5 μm (See, for example, claim 1 of Japanese Unexamined Patent Application Publication No. 2015-053530). Japanese Unexamined Patent Application Publication No. 2015-053530 also states that even when the thickness of the ceramic dielectric layers is reduced to 2.0 μm or less, a multilayer ceramic capacitor can be provided in which the relative permittivity of the dielectric layers is 5000 or more and that has stable electrostatic capacitance-temperature characteristics at the same time (See, for example, claim 1 and [0016] of Japanese Unexamined Patent Application Publication No. 2015-053530).

In Japanese Patent No. 5211262, a multilayer ceramic capacitor is disclosed whose dielectric layers are made of a sintered material including barium titanate and a silicon compound and in which a fresnoite phase with an average crystal grain diameter of 1 μm or less is present in the dielectric layers (See, for example, claim 1 of Japanese Patent No. 5211262). Japanese Patent No. 5211262 also states that when a fresnoite phase is formed, the dissolution of added compounds into the barium titanate is encouraged. Grain growth caused by firing, therefore, is encouraged, increasing the dielectric constant per grain (See, for example, [0047] of Japanese Patent No. 5211262).

As can be seen from the above, for multilayer ceramic capacitors, it has been proposed to increase the dielectric constant by controlling parameters such as the composition and its distribution or the crystal grain diameter in the dielectric ceramic layers. Such known approaches, however, have limitations in attempting to reduce the size and increase the capacitance of multilayer ceramic capacitors, although effective to some extent.

The inventors of example embodiments of the present invention conducted extensive research in view of such problems. As a result, for multilayer ceramic capacitors that include dielectric ceramic layers including a perovskite oxide as their base component and inner electrode layers, the inventors of example embodiments of the present invention directed their attention to the crystallographic plane of the crystal grains of the dielectric ceramic layers. Through this, the inventors of example embodiments of the present invention discovered that by controlling this crystallographic plane, the dielectric constant of the dielectric ceramic layers can be increased, and this enables a further reduction in the size and a further increase in the capacitance of the multilayer ceramic capacitors.

SUMMARY OF THE INVENTION

Example embodiments of the present invention provide multilayer ceramic capacitors that each enable a dielectric constant of dielectric ceramic layers to be increased and achieve a reduced size and increased capacitance.

A range expressed using ("from" and) "to" herein includes the values at both ends. In other words, "(from) X to Y" is synonymous with "X or more and Y or less."

According to an example embodiment of the present invention, a multilayer ceramic capacitor includes a first primary surface and a second primary surface opposite to each other in a thickness direction, a first side surface and a second side surface opposite to each other in a width direction, and a first end surface and a second end surface opposite to each other in a length direction, and a body including a plurality of dielectric ceramic layers and a plurality of inner electrode layers stacked in the thickness direction and a pair of outer electrodes provided at the first end surface and the second end surface, and coupled to the multiple inner electrode layers, wherein the dielectric ceramic layers include crystal grains including a perovskite oxide including at least one A-site element and at least one B-site element, when a cross-section of the dielectric ceramic layers is observed using scanning transmission electron microscope (S-TEM), the dielectric ceramic layers include {100} grains, on which a {100} plane of a perovskite structure is observed, as crystal grains, and when a thickness of the dielectric ceramic layers is denoted by d, at least a subset of the {100} grains is provided in near-electrode regions located inside the dielectric ceramic layers and extending to a distance of about 0.1 d from interfaces with adjacent inner electrode layers.

According to example embodiments of the present invention, multilayer ceramic capacitors are provided that each enable a dielectric constant of dielectric ceramic layers to be increased and achieve a reduced size and an increased capacitance.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described below with reference to the drawings. The present invention is not limited to the following example embodiments. Various modifications are possible within the scope of the present invention.

(1) Multilayer Ceramic Capacitor

A multilayer ceramic capacitor according to an example embodiment of the present invention includes a first primary surface and a second primary surface opposite to each other in a thickness direction, a first side surface and a second side surface opposite to each other in a width direction, and a first end surface and a second end surface opposite to each other in a length direction and includes a body including multiple dielectric ceramic layers and multiple inner electrode layers stacked in the thickness direction and a pair of outer electrodes provided at the first end surface and the second end surface, with one outer electrode at each end surface, and coupled to the multiple inner electrode layers. For the multilayer ceramic capacitor, the dielectric ceramic layers include crystal grains including a perovskite oxide including at least one A-site element and at least one B-site element. When a cross-section of the dielectric ceramic layers is observed using scanning transmission electron microscope (S-TEM), the dielectric ceramic layers include {100} grains, on which the {100} plane of the perovskite structure is observed, as crystal grains. When the thickness of the dielectric ceramic layers is denoted by d, at least a subset of the {100} grains is provided in near-electrode regions, which are regions located inside the dielectric ceramic layers and extending to a distance of about 0.1 d from the interfaces with the adjacent inner electrode layers.

Figure 1:
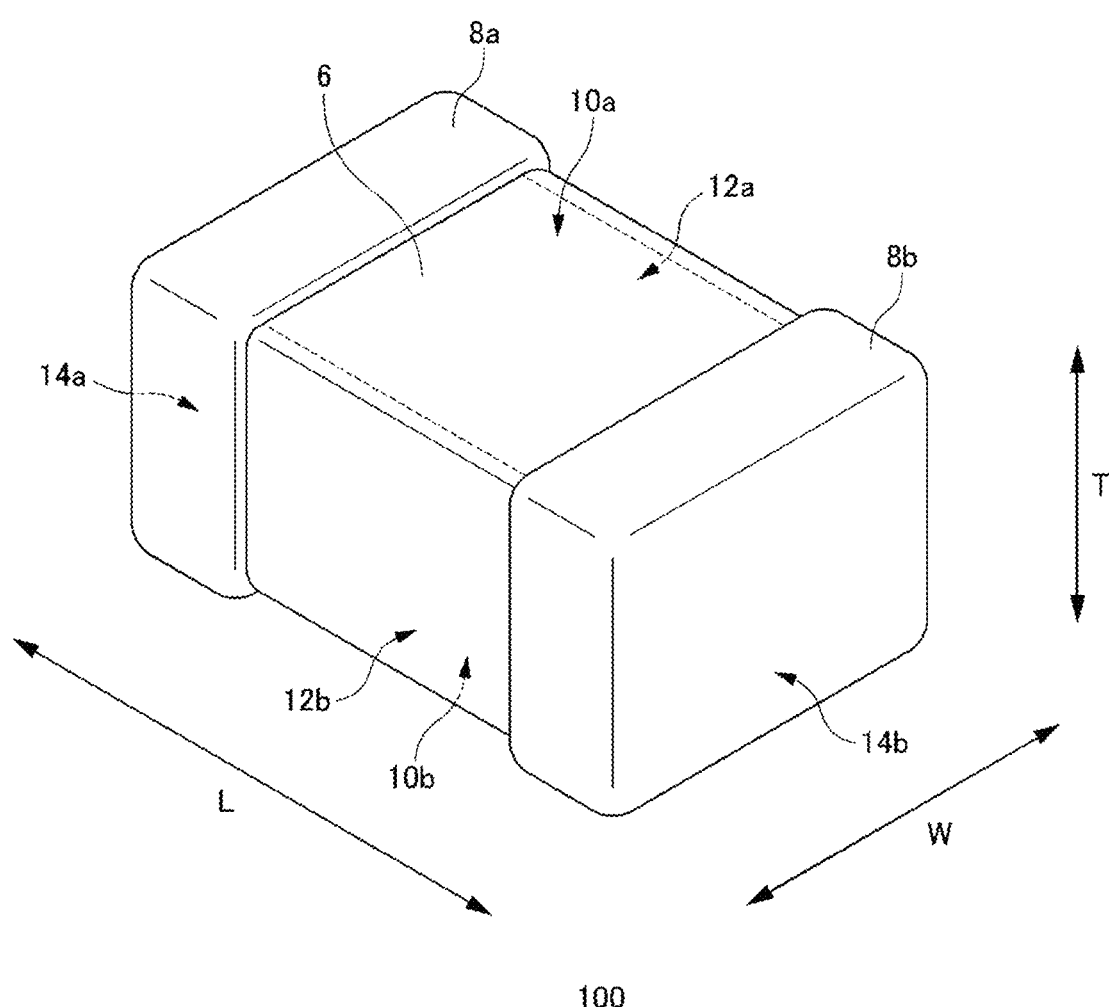
FIG. 1 is a perspective view illustrating the external shape of a multilayer ceramic capacitor according to an example embodiment of the present invention.
Figure 2:
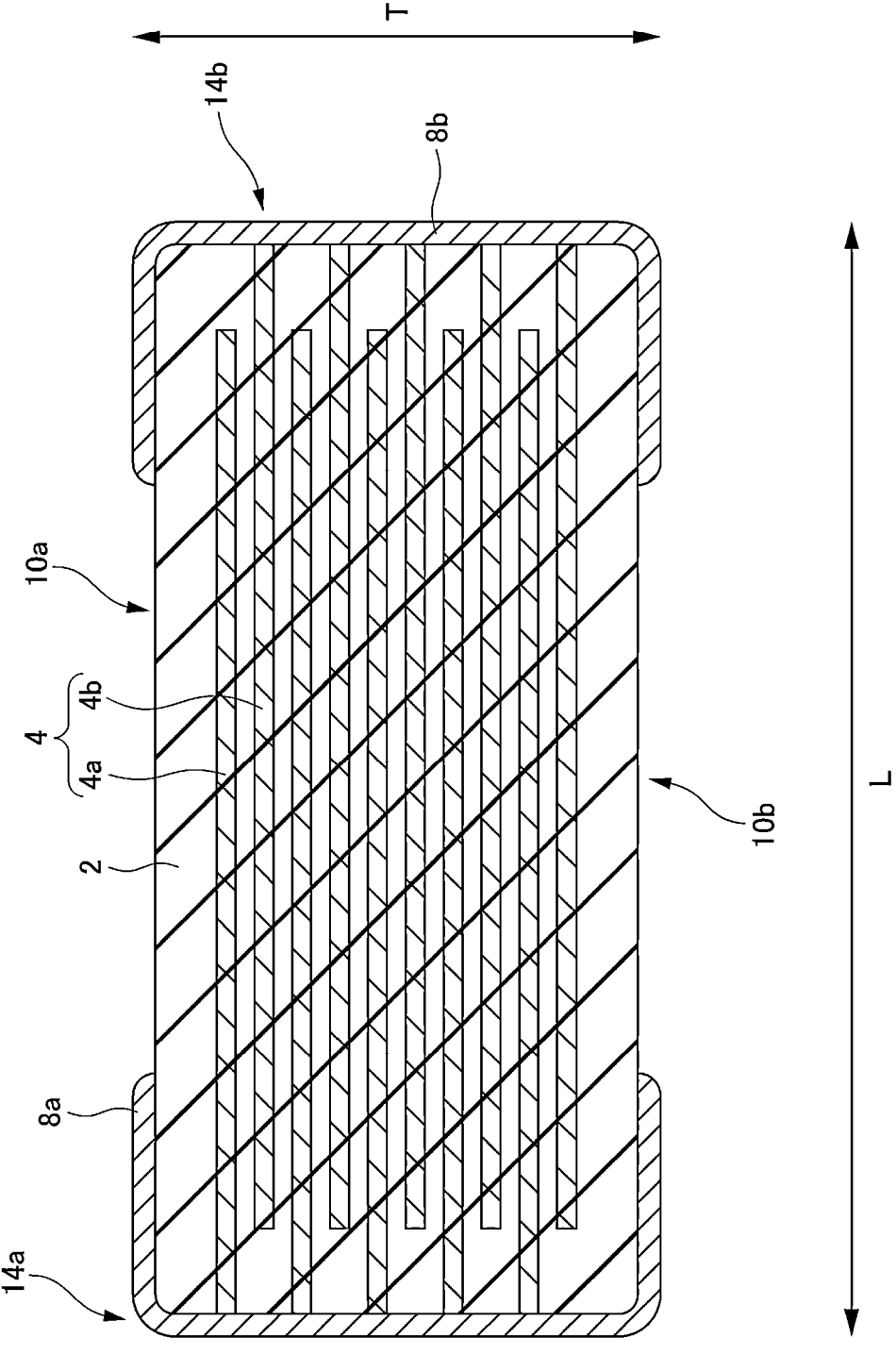
FIG. 2 is a cross-sectional view schematically illustrating the internal structure of a multilayer ceramic capacitor according to an example embodiment of the present invention.
Figure 3:
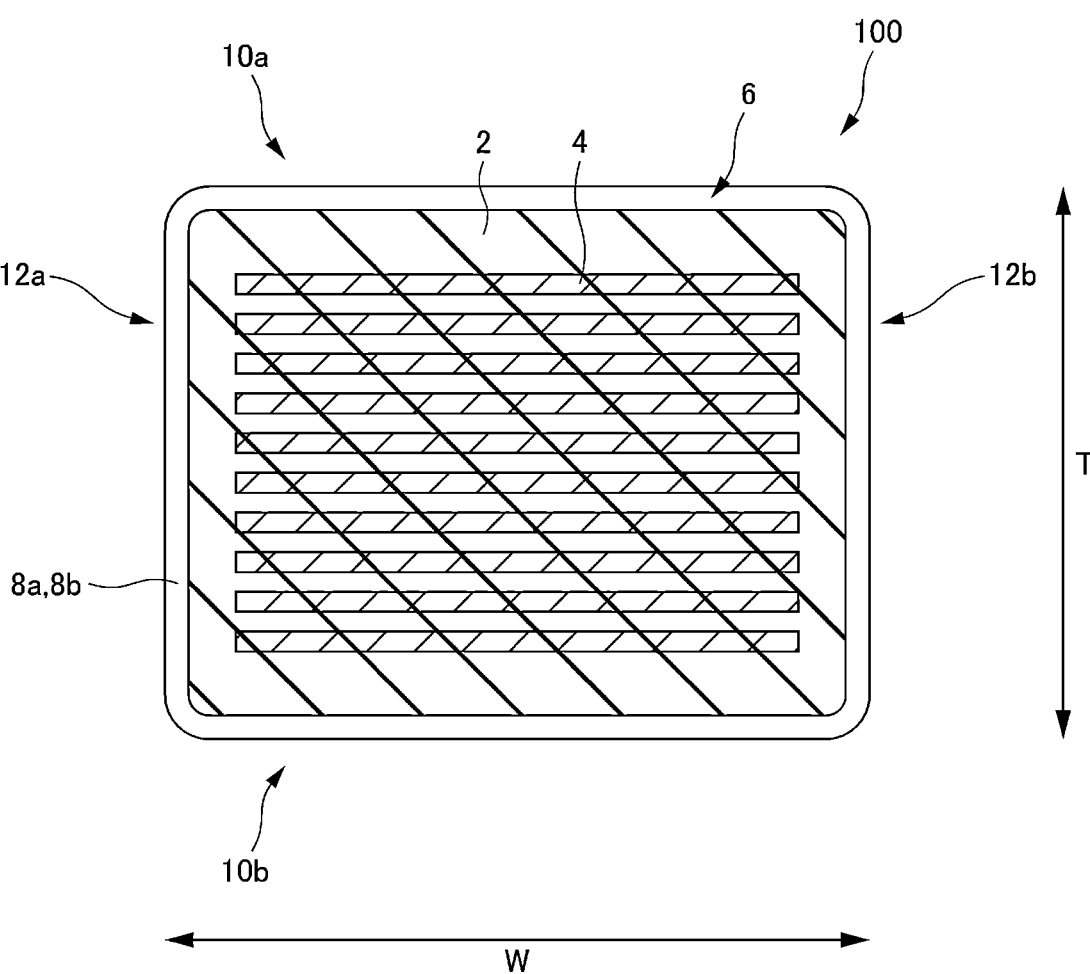
FIG. 3 is a cross-sectional view schematically illustrating the internal structure of a multilayer ceramic capacitor according to an example embodiment of the present invention.

A configuration of a multilayer ceramic capacitor according to an example embodiment of the present invention will be described using FIGS. 1 to 3. FIG. 1 is a perspective view illustrating the external shape of the multilayer ceramic capacitor. FIGS. 2 and 3 are cross-sectional views schematically illustrating the internal structure of the multilayer ceramic capacitor. The multilayer ceramic capacitor (100) includes a body (6) including multiple dielectric ceramic layers (2) and multiple inner electrode layers (4) stacked together and a pair of outer electrodes (8a and 8b) provided at the two end surfaces (14a and 14b) of this body (6). The multilayer ceramic capacitor (100) and the body (6) have a cuboid or substantially cuboid shape. Being substantially cuboid includes not only being a cuboid but also being a cuboid with rounded corners and/or edges. The multilayer ceramic capacitor (100) and the body (6) include a first primary surface (10a) and a second primary surface (10b) opposite to each other in a thickness direction T, a first side surface (12a) and a second side surface (12b) opposite to each other in a width direction W, and a first end surface (14a) and a second end surface (14b) opposite to each other in a length direction L. In this context, the thickness direction T refers to the direction in which the multiple dielectric ceramic layers (2) and the multiple inner electrode layers (4) are stacked. The length direction L refers to the direction perpendicular or substantially perpendicular to the end surfaces (14a and 14b), at which the outer electrodes (8a and 8b) are provided. The width direction W is the direction perpendicular or substantially perpendicular to the thickness direction T and the length direction L. A plane that includes the thickness direction T and the width direction W is defined as a WT plane, a plane that includes the width direction W and the length direction L is defined as an LW plane, and a plane that includes the length direction L and the thickness direction T is defined as an LT plane.

The outer electrodes (8a and 8b) include a first outer electrode (8a) provided at the first end surface (14a) and a second outer electrode (8b) provided at the second end surface (14b). The first outer electrode (8a) is not confined to the first end surface (14a). It may extend to a portion of the first primary surface (10a), second primary surface (10b), first side surface (12a), and second side surface (12b). The second outer electrode (8b) is not confined to the second end surface (14b). It may extend to a portion of the first primary surface (10a), second primary surface (10b), first side surface (12a), and second side surface (12b). The first outer electrode (8a) and the second outer electrode (8b), however, are not in contact with each other. Instead, they are electrically separated from each other.

The inner electrode layers (4) include multiple first inner electrode layers (4a) and multiple second inner electrode layers (4b). The first inner electrode layers (4a) extend to the first end surface (14a) and are electrically coupled to the first outer electrode (8a). The second inner electrode layers (4b) extend to the second end surface (14b) and are electrically coupled to the second outer electrode (8b). A first inner electrode layer (4a) and a second inner electrode layer (4b) facing each other with a dielectric ceramic layer (2) therebetween are not electrically coupled together. When a voltage is applied across the first inner electrode layers (4a) and the second inner electrode layers (4b) through the outer electrodes (8a and 8b), therefore, electric charge is stored. An electrostatic capacitance results from the stored electric charge, and it allows the capacitor to perform a function as a capacitive element.

The dimensions of the multilayer ceramic capacitor (100) are not particularly limited. However, the dimension in the length direction L is preferably, for example, about 0.2 mm or more and about 1.2 mm or less, the dimension in the width direction W is preferably, for example, about 0.1 mm or more and about 0.7 mm or less, and the dimension in the stacking direction T is preferably, for example, about 0.1 mm or more and about 0.7 mm or less.

Dielectric Ceramic Layers

The dielectric ceramic layers include crystal grains. These crystal grains are base components of the dielectric ceramic layers (base crystal grains) and include a perovskite oxide including at least one A-site element and at least one B-site element. In other words, the dielectric ceramic layers are sintered polycrystals including a perovskite oxide as their base component. A perovskite oxide has a composition represented by the general formula: $ABO_3$ and has cubic crystal structures, such as cubic, tetragonal, orthorhombic, and rhombohedral, at room temperature. Each of the atoms of the A-site element (hereinafter "A-site atoms") and the atoms of the B-site element (hereinafter "B-site atoms") occupies the A-site or B-site in the perovskite structure in its ionized state. Examples of A-site elements include elements with relatively large ionic sizes, such as barium (Ba), calcium (Ca), and strontium (Sr), and examples of B-site elements include elements with relatively small ionic sizes, such as titanium (Ti), zirconium (Zr), and hafnium (Hf).

Figure 4:
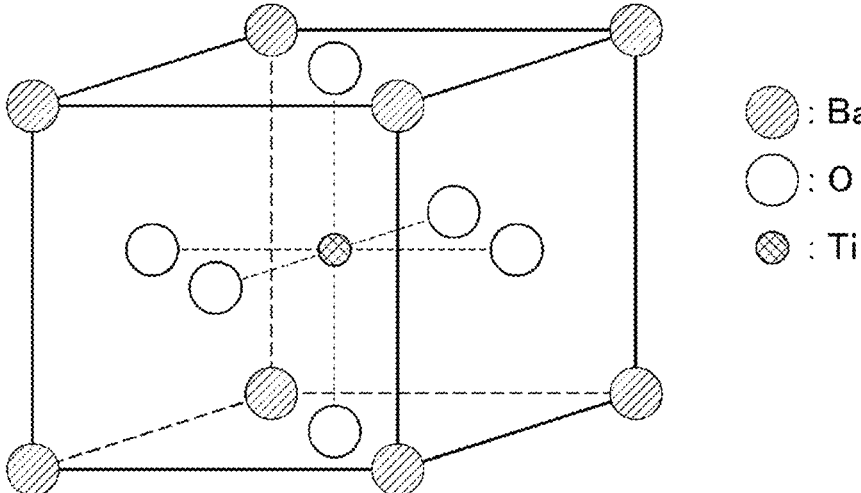
FIG. 4 illustrates a unit cell in a perovskite oxide crystal.

The crystal structure of a perovskite oxide is illustrated in FIG. 4. Ionized B-site atoms (hereinafter "B-site ions"), such as, for example, $Ti^{4+}$, occupy the body-center position of the unit cell, surrounded by six oxygen ions ($O^{2-}$) positioned at the surface-center positions and forming a regular octahedron. Ionized A-site atoms (hereinafter "A-site ions"), such as, for example, $Ba^{2+}$ occupy the eight corners of the unit cell. The positively charged A-site ions and/or B-site ions become displaced to cause dielectric polarization, enabling the oxide to have paraelectric or ferroelectric properties. An ionized atom (ion) may be simply referred to as an "atom" herein.

The combination of the A-site element and the B-site element is not particularly limited as long as the perovskite structure is maintained. Each of the A-site element and the B-site element may include only one element or may include multiple elements in combination. In addition, the percentage of the perovskite oxide in the dielectric ceramic layers may be, for example, about 50% by mass or more, may be about 60% by mass or more, may be about 70% by mass or more, may be about 80% by mass or more, or may be about 90% by mass or more.

Preferably, for example, the A-site element includes barium (Ba), and the B-site element includes titanium (Ti). The perovskite oxide, therefore, may be a barium titanate ($BaTiO_3$) compound. $BaTiO_3$ has a large spontaneous polarization at room temperature and thus is a ferroelectric substance, which has a high dielectric constant. Through the use of a $BaTiO_3$ compound as the base component, therefore, it becomes possible to obtain a further increase in the capacitance of the capacitor. $BaTiO_3$ compounds include not only $BaTiO_3$ but also compounds in which a subset of Ba atoms in $BaTiO_3$ have been replaced with at least one other A-site element, such as, for example, Sr and/or Ca, or compounds in which a subset of Ti atoms in $BaTiO_3$ have been replaced with at least one other B-site element, such as, for example, Zr and/or Hf. It is, however, preferable that the percentage of Ba in the A-site element is, for example, about 70% or more as a molar percentage, more preferably, about 80% or more, even more preferably about 90% or more. The percentage of Ti in the B-site element is, for example, preferably about 70% or more as a molar percentage, more preferably about 80% or more, even more preferably about 90% or more. The A-site element may exclude substances other than Ba and inevitable impurity elements, and the B-site element may exclude substances other than Ti and inevitable impurity elements. In this context, the inevitable impurities are substances that unavoidably contaminate the oxide during a manufacturing process.

The dielectric ceramic layers may include extra components, or components other than the base component, as added components. Although not limited, examples of added components include rare earth elements (REs), manganese (Mn), magnesium (Mg), silicon (Si), aluminum (Al), and vanadium (V). Rare earth elements (REs) is a generic term for the elements in the group including scandium (Sc), with atomic number 21, yttrium (Y), with atomic number 39, and lanthanum (La), with atomic number 57, to lutetium (Lu), with atomic number 71, in the Periodic Table. For rare earth elements (REs), one or more selected from the group of yttrium (Y), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) are preferable, and dysprosium (Dy) is particularly preferable. The structure in which the added components are present is not limited. They only need to be included in any of the crystal grains, grain boundaries, or triple points. When included in the crystal grains, the added components may occupy the A-site in the perovskite oxide ($ABO_3$), may occupy the B-site, or may occupy both sites simultaneously.

For the multilayer ceramic capacitor according to the present example embodiment, the dielectric ceramic layers include {100} grains as crystal grains. In this context, {100} grains are defined as crystal grains on which, when a cross-section of the dielectric ceramic layers is observed using scanning transmission electron microscope (S-TEM), the {100} plane of the perovskite structure is observed in at least a portion of the cross-section. In other words, a subset or all of the crystal grains are {100} grains. For a {100} grain, the {100} plane only needs to be observed in at least a certain region. The cross-section is a plane that includes the thickness direction, or the direction in which the dielectric ceramic layers and the inner electrode layers are stacked together. The cross-section can also be described as a plane perpendicular or substantially perpendicular from which is at right angles to the thickness direction, such as an LT plane or WT plane. Moreover, the {100} plane is a family of crystal lattice planes denoted by Miller indices and includes the six planes of the (100) plane, the (010) plane, the (001) plane, the (−100) plane, the (0-10) plane, and the (00-1) plane.

A scanning transmission electron microscope (S-TEM) is a device that scans a focused fine incident probe over a sample and observes its microscopic structure by converting transmitted electrons to a luminance signal. Due to advances in devices in recent years, the spatial resolution has improved to, for example, about 50 μm or less. In terms of detection sensitivity, S-TEM is now capable of capturing structures even at the single-atom level. With S-TEM, various images can be observed using electrons scattered by the sample. Of such images, images obtained by detecting electrons with scattering angles larger than the convergence angle of the incident probe using an annular detector are annular dark-field (ADF) images. Of ADF images, images with particularly large scattering angles are high angle annular dark-field (HAADF) images. Because the intensities of HAADFs correspond to the atomic number Z, HAADF images are superior in elemental discrimination. By analyzing a HAADF image in particular, therefore, positional data of elements can be evaluated with high accuracy.

The presence or absence and the percentage of {100} grains can be examined by acquiring an ADF image, a HAADF image, and/or an electron beam diffraction pattern for a central portion of the crystal grains of the dielectric ceramic layers and analyzing it/them. Specifically, during a S-TEM observation, an ADF image or HAADF image of a central portion of particular grains is obtained by nano beam electron diffraction (NBD). Then, when the {100} plane, based on the arrangement of the atoms of the perovskite oxide, is observed, the grains can be determined to be {100} grains. Alternatively, it is also possible to acquire an electron beam diffraction pattern by NBD and determine the grains to be {100} grains when only a periodic pattern based on the {100} plane is present in the electron beam diffraction pattern.

The S-TEM observation is performed on a cross-section that includes the direction along the thickness of the dielectric ceramic layers. More specifically, it is preferable to observe a region that is located in the middle of the dielectric ceramic layers in the length direction (L direction) and is at the center or approximate of a plane that includes the width direction (W direction) and the thickness direction (T direction) (WT plane). The observation only needs to cover a region with a field of view of, for example, about 10 μm× about 10 μm or a region including 200 crystal grains. The S-TEM observation is conducted with the axis of the microscope held in an orientation vertical or substantially vertical to the cross-section of the dielectric ceramic layers and by inclining the cross-section of the dielectric ceramic layers within the range of, for example, about ±5° in that state. Then grains on which the {100} plane is observed when the angle of inclination falls within this range (, for example about)±5° are identified as {100} grains. In short, grains with the {100} plane exposed within the range of about ±5° from an axis vertical to the cross-section of the dielectric ceramic layers are {100} grains.

Figure 5:
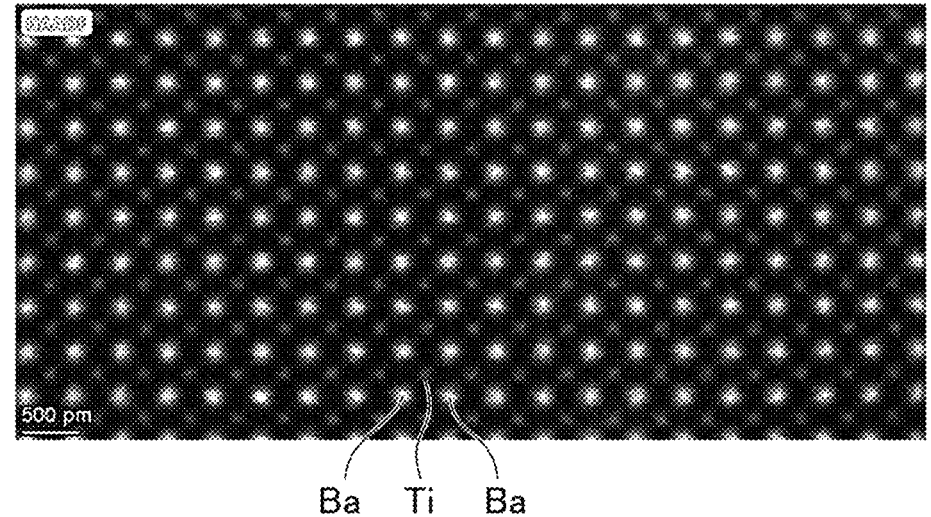
FIG. 5 presents a HAADF image of a cross-section of a dielectric ceramic layer.

{100} grains will be described in further detail based on actual measurement results. An example of a cross-sectional HAADF image of a {100} grain included in a dielectric ceramic layer of a multilayer ceramic capacitor according to the present example embodiment is shown in FIG. 5. The multilayer ceramic capacitor was made using barium titanate (BaTiO$_3$) in the dielectric ceramic layers. In FIG. 5, bright spots based on Ba and bright spots based on Ti are observed, and each set of bright spots forms a grid-shaped array of atoms (ions). The Ba bright spots exhibit higher luminance than the Ti bright spots. This is because the atomic weight of Ba is greater than that of Ti.

For the multilayer ceramic capacitor according to the present example embodiment, when the thickness of the dielectric ceramic layers is denoted by d, at least a subset of the {100} grains is provided in near-electrode regions. In this context, a near-electrode region is defined as a region located inside a dielectric ceramic layer and extending to a distance equal to about 10% of the thickness d, or about 0.1 d, from the interface with an adjacent inner electrode layer. The dielectric ceramic layers are in contact with an inner electrode layer at two surfaces, i.e., their upper surface and lower surface. The dielectric ceramic layers, therefore, have a near-electrode region with a thickness of about 0.1 d in each of their upper portion and lower portion. Through the provision of {100} grains in the near-electrode regions, it becomes possible to increase the dielectric constant of the dielectric ceramic layers. Although the details of the mechanism behind this are unclear, the inventors of example embodiments of the present invention presume that in near-Ni-electrode regions, a dielectric ceramic may possibly be likely to undergo C-axis orientation in the direction vertical or substantially vertical to the Ni electrodes, and therefore have a higher relative permittivity, because of large compressive stress from Ni. For the {100} grains, only at least a portion of them needs to be included in the near-electrode regions. More specifically, even if a portion of a {100} grain is included in a near-electrode region with the rest not included in the near-electrode region, this grain can be considered to be provided in a near-electrode region.

For the {100} grains included in the dielectric ceramic layers, only at least a subset of them needs to be provided in the near-electrode regions. In other words, only at least a subset of the crystal grains included in the near-electrode regions needs to be {100} grains. A subset of the {100} grains may be provided in the near-electrode regions, or, alternatively, all may be provided in the near-electrode regions. However, the higher the percentage of grains provided in the near-electrode regions of the {100} grains, the more preferable. Specifically, in the aforementioned cross-section, the percentage by number of {100} grains provided in the near-electrode regions of the {100} grains included in the dielectric ceramic layers is more preferably, for example, about 1% or more, and even more preferably about 3% or more.

Preferably, in the aforementioned cross-section, or a cross-section that includes the direction along the thickness of the dielectric ceramic layers, at least a subset of the {100} grains is provided in contact with the inner electrode layers. It is, therefore, preferable that at least a subset of the crystal grains are in contact with the inner electrode layers be {100} grains. Through the provision of {100} grains in contact with the inner electrode layers, it becomes possible to further increase the dielectric constant of the dielectric ceramic layers. The higher the percentage of {100} grains that are in contact with the inner electrode layers, the more preferable. On the aforementioned cross-section, the percentage by number {100} grains that are in contact with the inner electrode layers of the {100} grains contained in the dielectric ceramic layers is, for example, preferably about 1% or more, more preferably about 2% or more, even more preferably about 3% or more, still more preferably about 4% or more, particularly preferably about 5% or more, the most preferably about 6% or more.

Preferably, in the aforementioned cross-section, the {100} grains have an atom-distributed region at one or more atomic sites in the grains, and the area of this atom-distributed region ($S_{\Delta c \leq 2\%}$) is, for example, about 0.070 nm² or less. In this context, an atom-distributed region is a region that provides a measure of the spread of the positional distribution of an atom around a lattice point. Specifically, an atom-distributed region is a single region that is provided inside a unit cell centered around one lattice point in an ADF or HAADF image and in which the differential atomic concentration ($\Delta c$) of the A-site element or B-site element corresponding to this lattice point is, for example, about 2 atm % or less. In this context, the differential atomic concentration ($\Delta c$) is the atomic concentration of the element (A-site element or B-site element) (c) subtracted from its maximum ($C_{max}$) ($C_{max} - c$) inside the unit cell.

In an ideal crystal, atoms or ions are, at absolute zero, provided at the lattice points that they should occupy. At temperatures exceeding absolute zero, however, phonons arise, leading to thermal vibrations (lattice vibrations) of the atoms or ions around the lattice points. In a real crystal, defects such as lattice defects can occur, and this can cause atoms to be displaced to positions different from the lattice points. This is because the crystal field alters due to the defects. Consequently, the positional distribution of the atoms expands. To be more specific, when a unit cell centered around one certain lattice point is focused, the concentration of the atom that should occupy this lattice point is maximized at the lattice point and decreases with increasing distance from the lattice point. If it is possible to quantitatively estimate the size of the atom-distributed region, therefore, the spread of atomic position distribution can be evaluated based on this.

By reducing the area of the atom-distributed region ($S_{\Delta c \leq 5\%}$), the high-temperature operating life of the multilayer ceramic capacitor is extended, and this allows reliability to be increased. Although the details of the mechanism behind this are unclear, the inventors of example embodiments of the present invention presume as follows. That is, in a real crystal, a large number of lattice defects, such as, for example, oxygen vacancies and atomic defects, are present. Among others, multilayer ceramic capacitors are manufactured through firing in a reducing atmosphere. In the dielectric ceramic layers included therein, therefore, a large number of oxygen vacancies should be present. These oxygen vacancies are believed to be a cause from which the high-temperature operating life of multilayer ceramic capacitors is shortened. The inventors of example embodiments of the present invention also believe that when a large number of oxygen vacancies or other lattice defects are present, the positional distribution of the elements expands because the defects produce lattice strains, and, as a result, the area of the atom-distributed region increases. When the area of the atom-distributed region is small, by contrast, lattice strains are reduced in number, and the high-temperature operating life is extended. The smaller the area of the atom-distributed region, the more preferable. The area is, for example, preferably about 0.070 nm² or less, more preferably about 0.060 nm- or less, even more preferably about 0.050 nm- or less, still more preferably about 0.040 nm- or less, particularly preferably about 0.030 nm- or less, and the most preferably about 0.020 nm- or less. The lower limit is not particularly limited. For example, the area is about 0.001 nm- or more.

Figure 6:
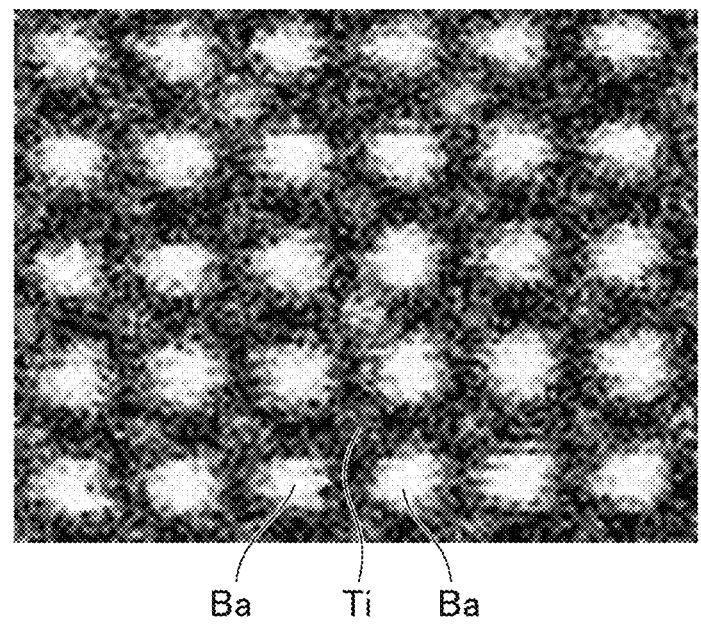
FIG. 6 presents a HAADF image of a cross-section of a dielectric ceramic layer.

The area of the atom-distributed region ($S_{\Delta c \leq 2\%}$) will be described in further detail based on actual measurement results. An example of a cross-sectional HAADF image of a {100} grain included in a dielectric ceramic layer of a multilayer ceramic capacitor according to the present example embodiment is presented in FIG. 5. A cross-sectional HAADF image of a multilayer ceramic capacitor obtained in the related art is presented in FIG. 6. Here, the multilayer ceramic capacitors according to the present example embodiment and in the related art were both made using barium titanate ($BaTiO_3$) in the dielectric ceramic layers. In both of FIGS. 5 and 6, bright spots based on Ba and bright spots based on Ti are observed, and each set of bright spots forms a grid-shaped array of atoms (ions). In the {100} grain according to the present example embodiment, however, the size of the bright spots is small. In the {100} grain in the related art, by contrast, the size of the bright spots is large. This is because in the {100} grain according to the present example embodiment, the regions in which ionized Ba and Ti atoms are distributed are concentrated in the vicinity of lattice points, but in the {100} grain in the related art, the Ba and Ti lattices are strained, leading to an expansion of the atom-distributed regions.

Figure 7:
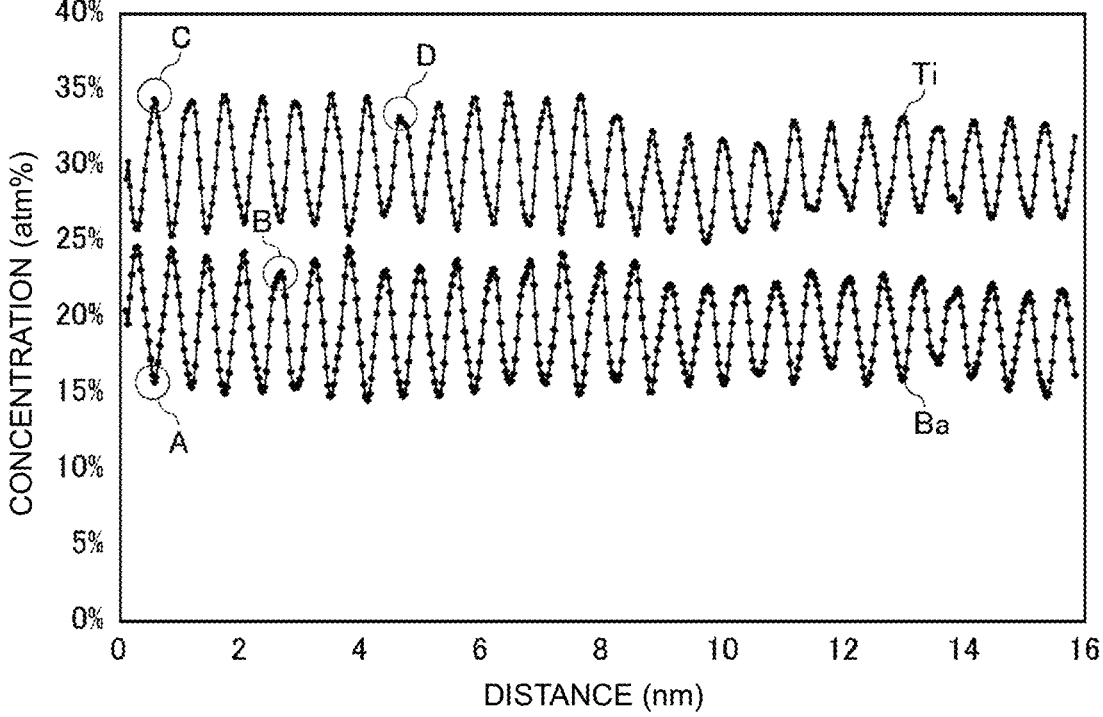
FIG. 7 is a graph that represents positional changes in Ba concentration and Ti concentration on a cross-section of a {100} grain.

An example or a method for measuring the area of the atom-distributed region ($S_{\Delta c \leq 2\%}$) will now be described. FIG. 7 represents positional changes in Ba concentration and Ti concentration on a cross-section of a {100} grain. This representation was obtained by performing compositional analysis along one straight line in the cross-section of the {100} grain by energy dispersive x-ray spectroscopy (EDX) and determining the atomic concentrations obtained through this analysis as functions of position (distance). The Ba concentration and the Ti concentration change periodically. Reflecting the positions of Ba and Ti in the crystal, the Ti concentration is minimized at positions at which the Ba concentration is maximized (peaks), and the Ti concentration is maximized at positions at which the Ba concentration is minimized.

Figure 8:
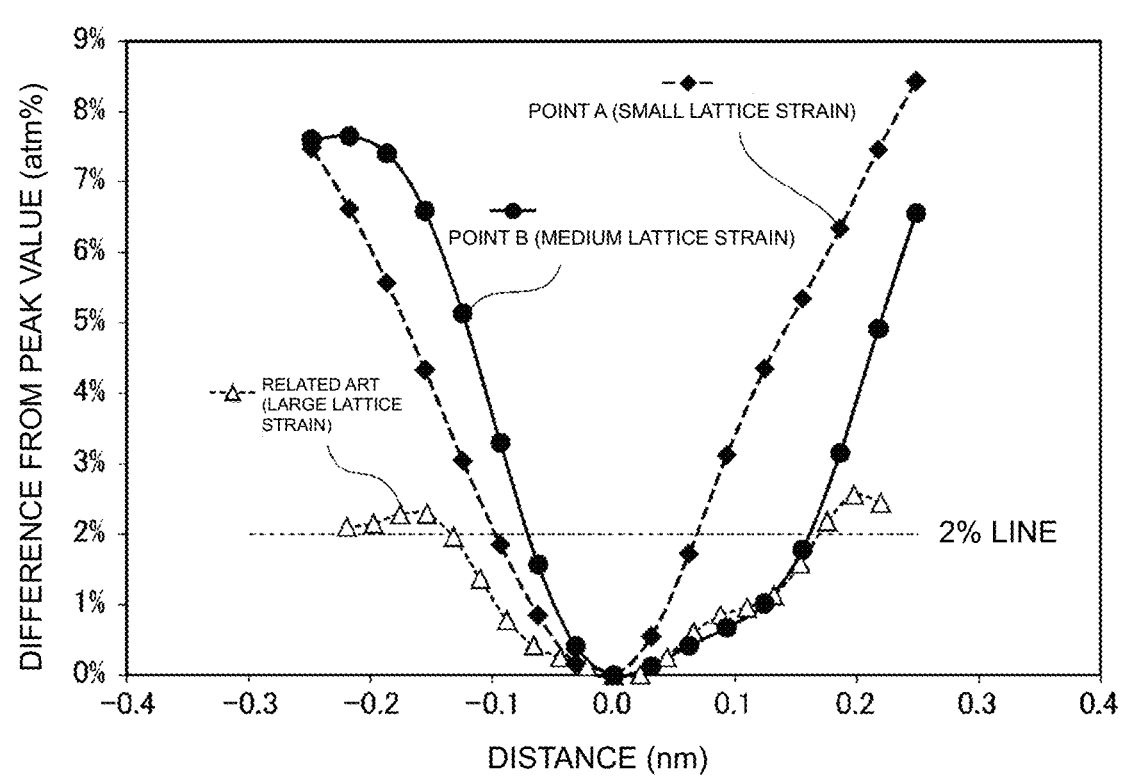
FIG. 8 is a graph that represents positional changes in differential Ba concentration for a one-lattice length.

FIG. 8 was obtained by setting a position in FIG. 7 at which the Ba concentration (c) is maximized ($C_{max}$) as the origin and mapping the differential Ba concentration ($\Delta c = C_{max} - C$) in a graph at about 30-pm intervals for a one-lattice length. In the {100} grain according to the present example embodiment, the positional changes in differential Ba concentration are sharp. In other words, the Ba concentration rapidly decreases as the measuring point moves away from the origin. In the {100} grain in the related art, by contrast, the differential Ba concentration is broad. This trend reflects the sizes of the bright spots in the HAADF images. If the distance, from the origin, of the position in the graph in FIG. 8 at which the differential Ba concentration ($\Delta c$) is about 2 atm % is determined and if the area of a circle having a radius equal or substantially equal to this distance is calculated, this area can be considered as the area of the regions in which Ba atoms are distributed ($S_{\Delta c \leq 2\%}$).

Specifically, in the graph in FIG. 8, a line at which the differential Ba concentration ($\Delta c$) is about 2 atm % is drawn parallel or substantially parallel to the horizontal axis. Then the distances from the vertical axis of the two points at which this line intersects the differential Ba concentration graph (point a and point b) are read and designated $d_a$ and $d_b$, respectively. The area of the atom-distributed region ($S_{\Delta c \leq 2\%}$) can then be determined according to formulae (2) and (3) below.

$$d = \frac{d_a + d_b}{2} \; \ldots \tag{2}$$

$$S_{\Delta c \leq 2\%} = \pi \cdot d^2 \; \ldots \tag{3}$$

For the dielectric ceramic layers, their thickness is, for example, preferably about 1.0 μm or less, and particularly preferably about 0.4 μm or less. Through the formation of the dielectric ceramic layers as thin layers, it becomes possible to provide an increase in the capacitance of the multilayer ceramic capacitor. When the dielectric ceramic layers are formed excessively thin, however, it becomes difficult to control decreases in insulating properties. The thickness of the dielectric ceramic layers is, for example, about 0.15 μm or more.

Inner Electrode Layers

The inner electrode layers include a conductive metal. The conductive metal can be a known electrode material, such as, for example, nickel (Ni), copper (Cu), silver (Ag), palladium (Pd), or an alloy including them. From the viewpoint of cost reduction, however, Ni and Cu, which are non-precious metals, are preferable, and Ni is particularly preferable, for example. The inner electrode layers may include extra components, or components other than the conductive metal. An example of an extra component is, for example, a ceramic substance that will work as a common material. An example of a ceramic substance is a perovskite oxide, such as a $BaTiO_3$ compound included in the dielectric ceramic layers.

The thickness of the inner electrode layers is preferably, for example, about 0.20 μm or more and about 0.80 μm or less. By setting the thickness of the inner electrode layers to about 0.20 μm or more, defects such as broken electrodes are reduced. Through the setting of the thickness to about 0.80 μm or less, it becomes possible to limit a decrease in the percentage of the dielectric ceramic layers in the capacitor and the resulting decrease in capacitance. The number of inner electrode layers is preferably, for example, 15 or more and 700 or less.

Outer Electrodes

The structure of the outer electrodes can be a known structure. For example, the outer electrodes may have a multilayer structure including a substrate layer, a first plating layer, and a second plating layer, with the substrate layer positioned closest to the end surfaces of the multilayer ceramic capacitor. The substrate layer includes metal, such as nickel (Ni) or copper (Cu), for example. A ceramic powder, may be included as a common material besides the metal. The first plating layer is, for example, a nickel (Ni) plating layer. The second plating layer is, for example, a tin (Sn) plating layer. A conductive resin layer may be provided between the substrate layer and the first plating layer. The conductive resin layer is a layer that includes particles of a conductive metal, such as, for example, copper (Cu), silver (Ag), or nickel (Ni), and a resin. The configuration of the outer electrodes is not limited as long as they are electrically coupled to the inner electrode layers and function as outer input/output terminals.

(2) Method for Manufacturing the Multilayer Ceramic Capacitor

For the multilayer ceramic capacitor according to the present example embodiment, an example manufacturing method is not limited as long as the requirements described above are satisfied. Preferably, however, the multilayer ceramic capacitor is manufactured by the following method. A preferred manufacturing method includes the following steps: a step of producing green sheets including at least a dielectric raw material (green sheet production step), a step of applying a conductive paste to the surface of the green sheets to obtain green sheets with a formed inner electrode pattern (electrode pattern formation step), a step of stacking and pressure-bonding multiple green sheets together to obtain a multilayer block (stacking step), a step of cutting the resulting multilayer block to obtain multilayer chips (cutting step), a step of applying debinding treatment and firing treatment to the resulting multilayer chips to obtain bodies (firing step), and a step of forming outer electrodes for the resulting bodies (outer electrode formation step). During the firing step, furthermore, firing treatment is applied to the multilayer chips while a pressure of, for example, about 75 MPa to about 100 MPa is applied in the thickness direction. The details of the individual steps will be described below.

Green Sheet Production Step

In the green sheet production step, green sheets including at least a dielectric raw material are produced. The green sheets are precursors to the dielectric ceramic layers of the capacitors and include a raw material for the base component of the dielectric ceramic layers and raw materials for added components. The production of the green sheets can be performed by a known approach and is not particularly limited. It only involves preparing a dielectric raw material by mixing the raw materials for added components into the raw material for the base component, slurrying the resulting dielectric raw material by adding a binder and a solvent to it and mixing them together, and shaping the green sheets from the resulting slurry.

The raw material for the base component can be a powder of a perovskite oxide ($ABO_3$), such as a $BaTiO_3$ compound, for example. The perovskite oxide powder can be synthesized by a known approach, such as, for example, solid-phase reaction, hydrothermal synthesis, or alkoxide hydrolysis. The raw materials for added components can be known ceramic raw materials, such as, for example, an oxide, carbonate, hydroxide, nitrate, organic acid salt, alkoxide, and/or chelate compound of the added components (e.g., REs, Mn, Mg, Si, Al, and V).

The mixing of the raw materials can be performed by a known method, with an example being the approach of weighing out the raw material for the base component and the raw materials for added components and mixing and grinding them by a wet process, together with a grinding medium and purified water, using a ball mill. When the mixing is performed by a wet process, the resulting mixture can be dried. The slurry formation can also be performed by a known approach, and only involves mixing an organic binder and an organic solvent into the dielectric raw material. The organic binder can be a known binder, such as, for example, a polyvinyl butyral binder. The organic solvent can be a known solvent, such as toluene or ethanol, for example. Additives, such as, for example, a plasticizer, may optionally be added to the slurry. The shaping of the green sheets, can be performed by a known method, such as doctor blading or RIP, for example.

Electrode Pattern Formation Step

In the electrode pattern formation step, green sheets with a formed inner electrode pattern are produced by applying a conductive paste to the surface of the green sheets. The inner electrode patterns will become inner electrode layers after firing. The conductive metal included in the conductive paste can be a conductive material such as, for example, nickel (Ni), copper (Cu), silver (Ag), palladium (Pd), or an alloy including them. To the conductive paste, a ceramic substance that will work as a common material may be added. The ceramic substance can be the raw material for the base component of the dielectric ceramic layers. The application of the conductive paste can be performed by a known method, such as screen printing or gravure printing, for example.

Stacking Step

In the stacking step, a multilayer block is produced by stacking and pressure-bonding multiple green sheets together. This is performed using green sheets with a formed inner electrode pattern, but a subset of them may be green sheets with no formed inner electrode pattern. The stacking and pressure bonding can be performed by a known approach.

Cutting Step

In the cutting step, multilayer chips are produced by cutting the resulting multilayer block. The cutting only needs to be performed such that chips in a predetermined size will be obtained and that at least a portion of the inner electrode patterns will be exposed on the end surfaces of the multilayer chips.

Firing Step

In the firing step, bodies are produced by applying debinding treatment and firing treatment to the resulting multilayer chips. Through the firing treatment, the green sheets and the inner electrode patterns are co-sintered, turning into dielectric ceramic layers and inner electrode layers, respectively. The conditions for the debinding treatment can be determined according to the type of organic binder included in the green sheets and the inner electrode patterns. The firing treatment only needs to be performed at a temperature at which the multilayer chips densify sufficiently. For example, it can be performed under conditions under which the multilayer chips are held at a temperature of about 1200° C. or above and about 1300° C. or below for 0 minutes or more and about 30 minutes or less. Moreover, the firing is performed in an atmosphere in which the perovskite oxide as the base component is not reduced and in which the oxidation of the conductive metal is limited. For example, it can be conducted in a $N_2$—$H_2$—$H_2O$ gas stream with a partial pressure of oxygen of about $10^{-10}$ to about $10^{-12}$ MPa. In addition, annealing treatment may be applied after the firing.

In the manufacturing method according to the present example embodiment, the raw material for the base component is a dielectric material having a relatively high degree of crystallization, such as a $BaTiO_3$ with a c-axis/a-axis ratio of about 1.0085 or greater, for example. In the firing step, the multilayer chips are held at a predetermined temperature for a predetermined duration. After the firing step, pressure is applied in the thickness direction during annealing treatment. By performing annealing treatment at a predetermined temperature while pressing the chips in the stacking direction in such a manner, stress is applied to the crystal grains having a relatively high degree of crystallization, and this stress causes the crystal grains to be rearranged, resulting in the advancement of orientation. The holding temperature is preferably, for example about 800° C. or above and about 1000° C. or below, and the holding duration (time for which the pressure is applied) is preferably, for example, about 30 minutes or more and about 120 minutes or less. The applied pressure is preferably, for example, about 1 MPa or more and about 120 MPa or less. With a pressing pressure of less than about 1 MPa, the rearrangement of the crystal grains is insufficient because the stress is inadequate. In the multilayer ceramic capacitors finally obtained, therefore, the percentage of {100} grains in the dielectric ceramic layers will not be increased. With a pressure of more than about 120 MPa, however, defects in the multilayer chips, such as breakage or chipping, for example, may occur because the pressing pressure is excessively large.

Outer Electrode Formation Step

In the outer electrode formation step, outer electrodes are formed for the resulting bodies. The formation of the outer electrodes can be performed by a known approach. For example, they can be formed by applying a conductive paste including one or more metals, such as silver (Ag), copper (Cu), and/or nickel (Ni), to the end surfaces of the bodies, on which the inner electrodes extending to there are exposed, and baking the applied paste. Alternatively, the approach of applying a conductive paste to both end surfaces of unfired multilayer chips and applying subsequent firing treatment may also be used. The formed electrodes may be used as substrate layers, and a plating film, for example, of nickel (Ni) or tin (Sn), may be formed on them. Through outer electrode formation in such a manner, multilayer ceramic capacitors are produced.

EXAMPLES

The present invention will be described in further detail using the following examples and comparative example. The present invention, however, is not limited to the following examples.

(1) Production of Multilayer Ceramic Capacitors

Comparative Example 1 and Examples 1 to 20

As the raw material for the base component, a $Ba_mTiO_3$ powder was prepared. In the formula, m is the A/B molar ratio of the perovskite oxide ($ABO_3$), i.e., the Ba/Ti molar ratio. The $Ba_mTiO_3$ powder was one with a grain diameter D50 of about 140 nm and a c-axis/a-axis ratio of the perovskite structure of about 1.0090, with m being about 1.005. Then the prepared $Ba_mTiO_3$ powder was weighed out, and aggregates were ground through wet-mixing in a ball mill.

Separately from the raw material for the base component, raw materials for added components (for example, Dy, Mg, Mn, Si, Al, or V) were weighed out. The raw materials for added components were, for example, dysprosium oxide ($Dy_2O_3$), magnesium carbonate ($MgCO_3$), manganese carbonate ($MnCO_3$), silicon oxide ($SiO_2$), aluminum oxide ($Al_2O_3$), and vanadium oxide ($V_2O_5$). The weighing out was performed such that Dy: about 1.0 molar part, Mg: about 0.03 molar parts, Mn: about 0.1 molar parts, Si: about 0.8 molar parts, Al: about 0.08 molar parts, and V: about 0.08 molar parts, all in relation to Ti in the base component: 100 molar parts.

Then the raw materials for added components were added to the raw material for the base component, the materials were wet-mixed using a ball mill, and then the resulting mixture was subjected to drying and heat treatment to give a dielectric raw material. To the resulting dielectric raw material, a polyvinyl butyral binder and ethanol as an organic solvent were added. A slurry was produced by wet-mixing the materials in a ball mill for a predetermined duration. By shaping this slurry into sheets, green sheets for dielectric ceramic layers were produced.

Then a Ni-based conductive paste was applied to the surface of the resulting green sheets by screen printing, and thus conductive paste layers, intended to be inner electrode layers, were formed in patterns. After that, a multilayer block was produced by stacking multiple green sheets with a formed conductive paste layer together, placing a green sheet with no formed conductive paste layer on top of and under the stack, and pressure-bonding the entire workpiece. Subsequently, the resulting multilayer block was cut with a dicing saw into multilayer chips. The stacking was performed such that the end portions to which the conductive paste layers extended alternate. The cutting was performed such that the conductive paste layers would be exposed on the side surfaces.

To both side surfaces, on which the conductive paste layers were exposed, of the cut multilayer chips, a green sheet for a side margin (side-margin green body) was attached. The production of the green sheets for side margins was conducted in the same or substantially the same manner as that of the green sheets for dielectric ceramic layers.

The multilayer chips with attached side-margin green sheets were fired in a $N_2$—$H_2O$—$H_2$ gas stream under the conditions of a partial pressure of oxygen of about $1.8 \times 10^{-9}$ to about $8.7 \times 10^{-10}$ MPa, a rate of temperature increase of about 20° C./second, and a maximum temperature of about 1260° C.×0.5 hours. After the firing, the chips were subjected to annealing treatment in an atmosphere with a partial pressure of oxygen of about $1.0 \times 10^{-12}$ to about $10^{-15}$ MPa and at about 800° C. to about 1000° C. while being pressed in the stacking direction. In this manner, bodies of multilayer ceramic capacitors were obtained.

To the end surfaces, to which inner electrode layers extended, of the bodies obtained through the firing, a conductive paste including copper (Cu) as its base component was applied. After that, by baking the applied conductive paste at about 900° C., a substrate layer of outer electrodes was formed. The surface layer of the substrate layer was subjected to Ni plating and Sn plating in this order by wet-plating. In this manner, multilayer ceramic capacitors were produced.

For the produced multilayer ceramic capacitors, the length L dimension was about 0.4 mm, the dimension in the width direction W was about 0.2 mm, and the dimension in the thickness direction T was about 0.2 mm. In the inner-layer portion, furthermore, the thickness of the dielectric layers was about 0.5 μm, the thickness of the inner electrode layers was about 0.4 μm, and the number of dielectric ceramic layers was 150.

(2) Evaluations

For the resulting multilayer ceramic capacitors, the evaluation of different characteristics was conducted as follows.

Dielectric Properties

The electrostatic capacitance C of the multilayer ceramic capacitors was measured using an automatic measuring bridge. The measurement was performed under the conditions of a temperature of about 25° C., an effective voltage of about 0.5 Vrms, and a frequency of about 1 kHz. Then, using the electrostatic capacitance C, the relative permittivity ($\varepsilon_r$) of the dielectric ceramic layers was determined. With the relative permittivity value in Comparative Example 1 as a reference, furthermore, the percentage to it was determined as the percentage relative permittivity (percentage $\varepsilon_r$).

High-Temperature Operating Life

The multilayer ceramic capacitors were subjected to a highly accelerated life test (HALT) for the determination of the mean time to failure (MTTF). In the highly accelerated life test, a high-temperature load was applied to the multilayer ceramic capacitors under the conditions of about 150° C. and about 6.3 V. Then the mean time to failure (MTTF) was calculated, with the time at which the insulation resistance fell to about 10 k Ω or less considered failure. The sample size was set to ten. With the mean time to failure value in Comparative Example 1 as a reference, the percentage thereto was determined as the percentage MTTF.

S-TEM Observation

A cross-section of the dielectric ceramic layers of a multilayer ceramic capacitor was observed using scanning transmission electron microscope (S-TEM). Prior to the S-TEM observation, a sample for observation was prepared by creating a thin film by the focused ion beam (FIB) technique. Specifically, from the middle of the multilayer ceramic capacitor in the length direction (L direction), a thin-slice sample, with a thickness of about 100 nm or less, having a plane including the width direction and the thickness direction (WT plane) was extracted. For this thin-slice sample, its thickness was smaller than the radius of the crystal grains included in the sample. Then, for 200 crystal grains in the thin-slice sample, a central portion of each crystal grain was observed by scanning transmission electron microscope (S-TEM) under the conditions of a spatial resolution of about 100 pm or less, and analysis by nano beam electron diffraction (NBD) was performed. The S-TEM observation was performed under the following conditions.

Then the number of {100} grains was counted, with grains on which the {100} plane was observed when the sample was inclined within the range of about ±5° identified as {100} grains. Then, of the {100} grains, the number of grains that were included in the near-electrode regions and the number of grains that were in contact with the inner electrode layers were counted, and their percentages were calculated. An example of a HAADF image of a region in a {100} grain in which an array of atoms is observed is presented in FIG. 5.

Figure 9:
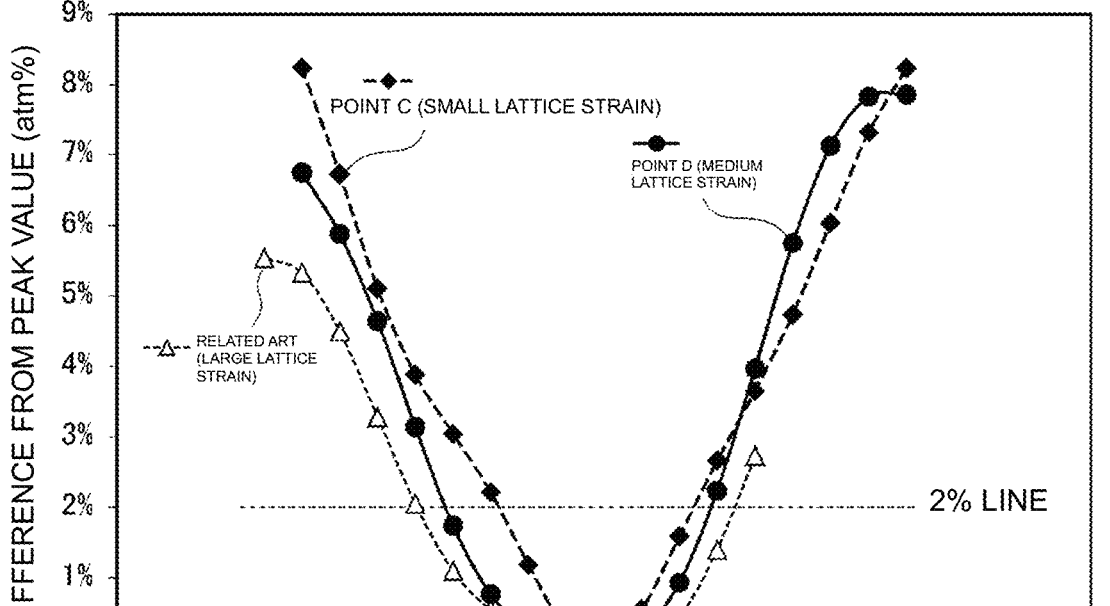
FIG. 9 is a graph that represents positional changes in differential Ti concentration for a one-lattice length.

On the HAADF images obtained, the Ba concentration and Ti concentration in the cross-section of the {100} grain were determined as functions of distance (positional changes) using the EDX system that came with the S-TEM and mapped in a graph. An example of a graph obtained is presented in FIG. 7. In FIG. 7, point A is a point at which the positional changes in Ba concentration are relatively sharp, and point B is a point at which the changes are relatively broad. Point C in FIG. 7 is a point at which the positional changes in Ti concentration are relatively sharp, and point D is a point at which the changes are relatively broad. At points at which the positional changes are sharp, the lattice strain should be small. At points at which the positional changes are broad, by contrast, the lattice strain should be large. Subsequently, for a one-lattice length including points A to D, the differential concentration of each of Ba and Ti ($\Delta c = C_{max} - C$) was determined as a function of distance (positional changes) and mapped in a graph. The graphs obtained are presented in FIGS. 8 and 9. FIGS. 8 and 9 also present results obtained for a $BaTiO_3$ produced in the related art for comparison purposes.

Then, based on the graphs obtained, the area of each of the region in which Ba atoms were distributed and the region in which Ti atoms were distributed ($S_{\Delta c \leq 2\%}$) was determined. Specifically, a line at which the differential Ba concentration ($\Delta c$) was about 2 atm % was drawn parallel or substantially parallel to the horizontal axis. Then the distances from the vertical axis of the two points at which this line intersected the differential Ba concentration graph (point a and point b) were read and designated $d_a$ and $d_b$, respectively. The area of the atom-distributed region ($S_{\Delta c \leq 2\%}$) was then calculated according to formulae (2) and (3) below. The area of the atom-distributed region was calculated for all detected {100} grains, and the average was determined across ten selected grains with the smallest areas.

$$d = \frac{d_a + d_b}{2} \; \ldots \tag{2}$$

$$S_{\Delta c \leq 2\%} = \pi \cdot d^2 \; \ldots \tag{3}$$

(3) Evaluation Results 3

For Comparative Example 1 and Examples 1 to 20, the pressing conditions during firing and the characteristics of the dielectric ceramic layers are summarized in Table 1 below. It should be noted that in Table 1 below, the areas of the region in which Ba atoms were distributed ($S_{\Delta c \leq 2\%}$) are presented. The areas of the region in which Ti atoms were distributed were the same or substantially the same as the values for Ba.

TABLE 1

Pressure Application Conditions during Firing and Characteristics of Dielectric Ceramic Layers

| | Pressure application conditions during firing | | | Microscopic structure of dielectric ceramic layers | | | Characteristics of dielectric ceramic layers | | | |
| | | | | Percentage by number of {100} grains present in the near-electrode regions (%) | Percentage by number of {100} grains in contact with the inner electrode layers (%) | | | | | |
| | Pressure (MPa) | Temperature for application (° C.) | Duration of application (min) | | | $S_{\Delta c \leq 2\%}$ (nm$^2$) | $\varepsilon_r$ | Percentage $\varepsilon_r$ (%) | MTTF (hr) | Percentage MTTF (%) |
|---|---|---|---|---|---|---|---|---|---|---|
| Comparative Example 1 | 0 | 800 | 30 | 0 | 0 | ND | 2430 | 100 | 20 | 100 |
| Example 1 | 0.5 | 800 | 30 | 1 | 1 | ND | 2660 | 109 | 19 | 95 |
| Example 2 | 1 | 800 | 30 | 1 | 1 | ND | 2920 | 120 | 20 | 100 |
| Example 3 | 1.5 | 800 | 30 | 2 | 2 | 0.070 | 2940 | 121 | 25 | 125 |
| Example 4 | 2 | 800 | 30 | 2 | 1 | 0.070 | 3120 | 128 | 26 | 130 |
| Example 5 | 3 | 800 | 30 | 3 | 1 | 0.069 | 3240 | 133 | 27 | 135 |
| Example 6 | 3 | 800 | 60 | 3 | 1 | 0.065 | 3220 | 133 | 26 | 130 |
| Example 7 | 5 | 800 | 30 | 2 | 1 | 0.060 | 3250 | 134 | 25 | 125 |
| Example 8 | 6 | 800 | 30 | 3 | 2 | 0.057 | 3270 | 135 | 30 | 150 |
| Example 9 | 6 | 800 | 60 | 2 | 2 | 0.054 | 3290 | 135 | 33 | 165 |
| Example 10 | 6 | 800 | 90 | 2 | 1 | 0.052 | 3300 | 136 | 31 | 155 |
| Example 11 | 2 | 1000 | 30 | 4 | 3 | 0.060 | 3500 | 144 | 30 | 150 |
| Example 12 | 3 | 1000 | 30 | 5 | 3 | 0.054 | 3520 | 145 | 35 | 175 |
| Example 13 | 6 | 1000 | 30 | 5 | 4 | 0.050 | 3500 | 144 | 36 | 180 |
| Example 14 | 6 | 1000 | 90 | 5 | 4 | 0.049 | 3550 | 146 | 42 | 210 |
| Example 15 | 10 | 1000 | 30 | 6 | 5 | 0.046 | 3530 | 145 | 47 | 235 |
| Example 16 | 15 | 1000 | 30 | 6 | 5 | 0.040 | 3540 | 146 | 47 | 235 |
| Example 17 | 20 | 1000 | 30 | 7 | 6 | 0.036 | 3610 | 149 | 55 | 275 |
| Example 18 | 20 | 1000 | 60 | 8 | 6 | 0.030 | 3640 | 150 | 70 | 350 |
| Example 19 | 20 | 1000 | 90 | 8 | 7 | 0.022 | 3680 | 151 | 76 | 380 |
| Example 20 | 20 | 1000 | 120 | 10 | 7 | 0.020 | 3710 | 153 | 81 | 405 |

Note 1)

"ND" represents not detected.

With increasing applied pressure and extended duration of application during the firing step in the manufacture of the multilayer ceramic capacitors, the percentage by number of {100} grains present in the near-electrode regions increased, and the relative permittivity ($\varepsilon_r$) became higher accordingly. In particular, in Examples 5, 6, 8, and 11 to 20, in which the percentage by number was about 3% or more, the relative permittivity was about 3220 or greater, and in Examples 15 to 20, in which the percentage by number was about 6% or more, the relative permittivity was about 3530 or greater.

With increasing applied pressure and extended duration of application, the area of the atom-distributed region ($S_{\Delta c \leq 2\%}$) decreased, and the high-temperature operating life (MTTF) extended accordingly. In particular, in Examples 13 to 20, in which $S_{\Delta c \leq 2\%}$ was about 0.050 nm$^2$ or less, the MTTF was about 36 hours or more, and in Examples 18 to 20, in which $S_{\Delta c \leq 2\%}$ was about 0.030 nm$^2$ or less, the MTTF was about 70 hours or more.

In Comparative Example 1, by contrast, the relative permittivity was as low as about 2430, and the MTTF was only about 20 hours.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a first primary surface and a second primary surface opposite to each other in a thickness direction, a first side surface and a second side surface opposite to each other in a width direction, and a first end surface and a second end surface opposite to each other in a length direction; and a body including a plurality of dielectric ceramic layers and a plurality of inner electrode layers stacked in the thickness direction and a pair of outer electrodes provided at the first end surface and the second end surface and coupled to the plurality of inner electrode layers; wherein the plurality of dielectric ceramic layers include crystal grains including a perovskite oxide including at least one A-site element and at least one B-site element;

when a cross-section of the plurality of dielectric ceramic layers is observed using a scanning transmission electron microscope, the plurality of dielectric ceramic layers include {100} grains, on which a {100} plane of a perovskite structure is observed, as the crystal grains;

when a thickness of the dielectric ceramic layers is denoted by d, at least a subset of the {100} grains is provided in near-electrode regions located inside the plurality of dielectric ceramic layers and extending to a distance of about 0.1d from interfaces with adjacent inner electrode layers of the plurality of inner electrode layers; and when compositional analysis of a {100} grain is performed by energy dispersive x-ray spectroscopy in the cross-section, the {100} grain has an atom-distributed region in which a concentration of one A-site element or B-site element (c) subtracted from a maximum concentration of the element ($C_{max}$) ($\Delta C = C_{max} - C$) is about 2 atm % or less, and an area of the atom-distributed region ($S_{\Delta C \leq 2\%}$) is about 0.070 nm$^2$ or less.

2. The multilayer ceramic capacitor according to claim 1, wherein, in the cross-section, at least a subset of the {100} grains is in contact with the plurality of inner electrode layers.

3. The multilayer ceramic capacitor according to claim 1, wherein, in the cross-section, a percentage by number of {100} grains that are in contact with the plurality of inner electrode layers of the {100} grains included in the plurality of dielectric ceramic layers is about 1% or more.

4. The multilayer ceramic capacitor according to claim 1, wherein, in the cross-section, a percentage by number of {100} grains that are in contact with the plurality of inner electrode layers of the {100} grains included in the plurality of dielectric ceramic layers is about 3% or more.

5. The multilayer ceramic capacitor according to claim 1, wherein the area of the atom-distributed region ($S_{\Delta c \leq 2\%}$) is about 0.050 nm$^2$ or less.

6. The multilayer ceramic capacitor according to claim 1, wherein the A-site element includes barium (Ba), and the B-site element includes titanium (Ti).

7. The multilayer ceramic capacitor according to claim 1, wherein a dimension of the multilayer ceramic capacitor in the length direction is about 0.4 mm, a dimension of the multilayer ceramic capacitor in the width direction is about 0.2 mm, and a dimension of the multilayer ceramic capacitor in the thickness direction is about 0.2 mm.

8. The multilayer ceramic capacitor according to claim 1, wherein a percentage of the perovskite oxide in the plurality of dielectric layers is about 50% by mass or more.

9. The multilayer ceramic capacitor according to claim 1, wherein a percentage of the perovskite oxide in the plurality of dielectric layers is about 60% by mass or more.

10. The multilayer ceramic capacitor according to claim 1, wherein a percentage of the perovskite oxide in the plurality of dielectric layers is about 70% by mass or more.

11. The multilayer ceramic capacitor according to claim 1, wherein a percentage of the perovskite oxide in the plurality of dielectric layers is about 80% by mass or more.

12. The multilayer ceramic capacitor according to claim 1, wherein a percentage of the perovskite oxide in the plurality of dielectric layers is about 90% by mass or more.

13. The multilayer ceramic capacitor according to claim 1, wherein each of the plurality of dielectric ceramic layers includes at least one of a rare earth element, manganese, magnesium, silicon, aluminum, or vanadium.

14. The multilayer ceramic capacitor according to claim 1, wherein a thickness of each of the plurality of dielectric ceramic layers is about 1.0 μm or less.

15. The multilayer ceramic capacitor according to claim 1, wherein a thickness of each of the plurality of dielectric ceramic layers is about 0.4 μm or less.

16. The multilayer ceramic capacitor according to claim 1, wherein each of the plurality of inner electrode layers includes nickel, copper, silver, palladium, or an alloy including at least one of nickel, copper, silver, or palladium.

17. The multilayer ceramic capacitor according to claim 1, wherein a thickness of each of the plurality of inner electrode layers is about 0.20 μm or more and about 0.80 μm or less.

18. The multilayer ceramic capacitor according to claim 1, wherein a number of the plurality of inner electrode layers is 15 or more and 700 or less.

19. The multilayer ceramic capacitor according to claim 1, wherein, in the cross-section, a percentage by number of {100} grains that are in contact with the plurality of inner electrode layers of the {100} grains included in the plurality of dielectric ceramic layers is about 6% or more.

* * * * *